UNITED STATES PATENT OFFICE.

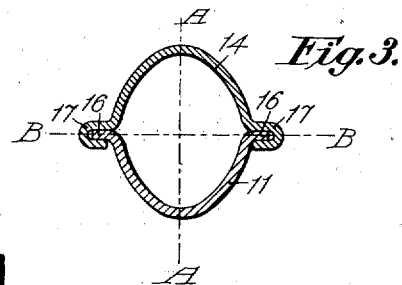
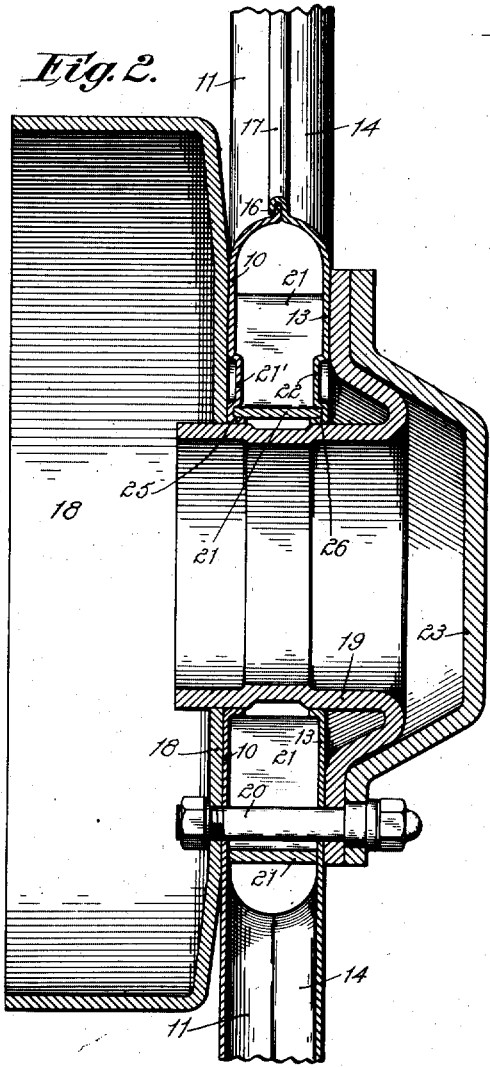
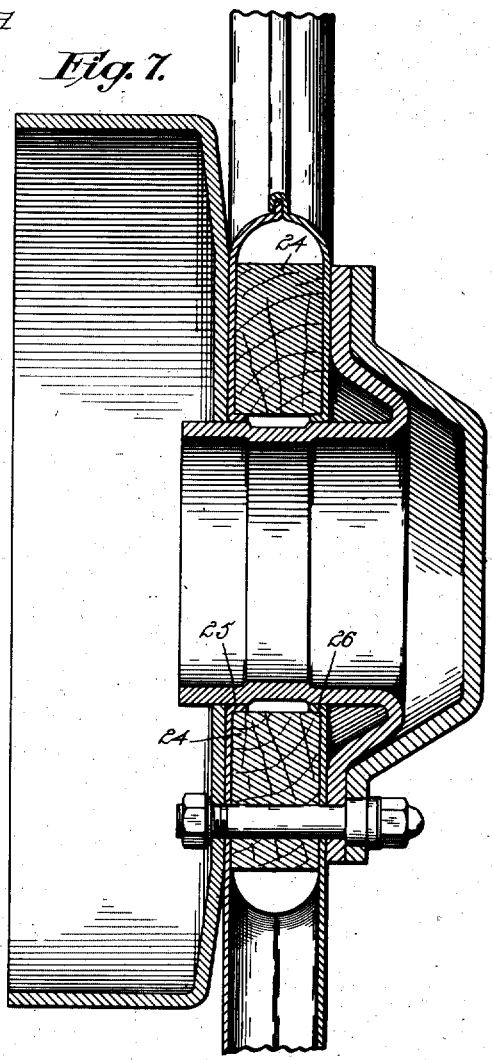

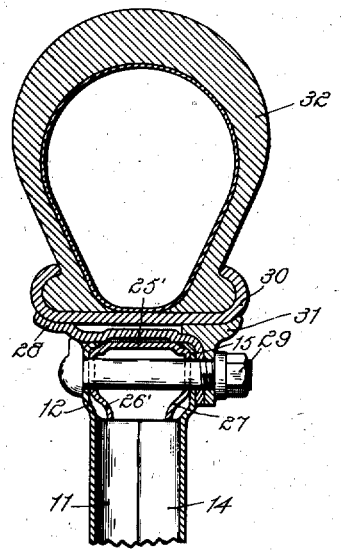
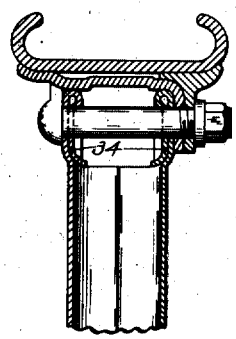
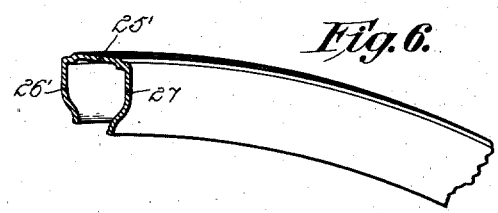
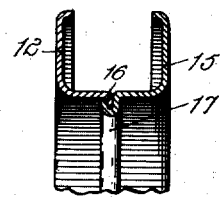

LEON C. SCHWAB, OF MILWAUKEE, WISCONSIN, ASSIGNOR TO A. O. SMITH COMPANY, OF MILWAUKEE, WISCONSIN, A CORPORATION OF WISCONSIN.

AUTOMOBILE-WHEEL.

1,227,841.  Specification of Letters Patent.  Patented May 29, 1917.

Application filed February 24, 1914. Serial No. 820,421.

*To all whom it may concern:*

Be it known that I, LEON C. SCHWAB, a citizen of the United States, residing at Milwaukee, in the county of Milwaukee and State of Wisconsin, have invented certain new and useful Improvements in Automobile-Wheels, of which the following is a full, clear, concise, and exact description, reference being had to the accompanying drawings, forming a part of this specification.

My invention relates to automobile wheels and, more specifically, to sheet metal wheels, preferably pressed or stamped from sheet steel.

In a general way, the automobile wheels of my invention are formed of an inner half and an outer half, each of the halves being stamped and pressed from a single sheet of steel and each half or member comprising a hub section, spoke sections, and a felly section. Each half or member is suitably dished so that the two halves when brought into register will form hollow spokes joined to a more or less hollow felly and a more or less hollow hub section. Each half or member is provided with a laterally extended flange integral with the hub, spoke and felly sections and lying in substantially the median plane through the spokes of the wheel. The flanges of the two halves or members register with one another, whereby the flanges may be joined in order to fasten the two halves of the wheel together. These flanges, however, serve not only to join the two halves of the wheel, but also to provide such a distribution of metal as will give great strength to the completed wheel, notwithstanding the fact that its members are stamped and pressed from comparatively light stock. The hub sections of the two wheel members are preferably separated by a suitable spacer, which may be formed of sheet metal or of wood, or other suitable material in the manner hereinafter described in detail.

The objects of my invention, which will hereinafter more fully appear, are to provide automobile wheels of great strength, light weight, low cost of manufacture, and pleasing appearance.

My invention will be more clearly understood by reference to the accompanying drawings, in which—

Fig. 2 is a partial cross-sectional view on an enlarged scale taken on line 2—2 of Fig. 1;

Fig. 3 is a partial cross-sectional view of one of the spokes taken on line 3—3 of Fig. 1 and illustrated on an enlarged scale;

Fig. 4 is a partial cross-sectional view on line 4—4 of Fig. 1, showing a pneumatic tire in place upon the wheel;

Fig. 5 is a partial cross-sectional view on line 5—5 of Fig. 1, illustrating the form of the felly;

Fig. 6 is a view showing the felly filler partly in elevation and partly in cross-section;

Fig. 7 is a cross-sectional view similar to that of Fig. 2 but showing a modified form of hub filler; and Fig. 8 is a partial cross-sectional view similar to that of Fig. 4, but showing a modified form of felly construction.

Figure 1:
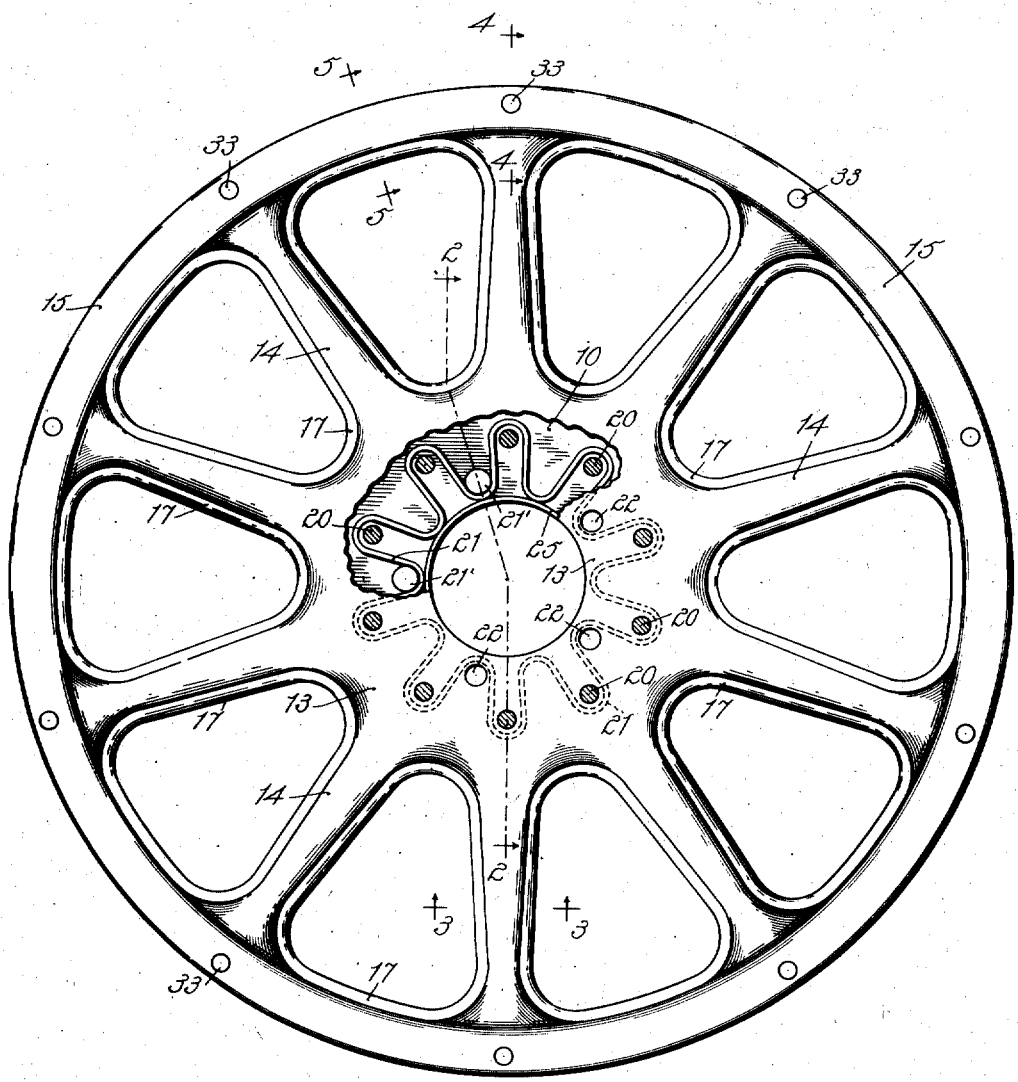
Figure 1 is a side elevation of a wheel constructed in accordance with my invention.

Referring first to the preferred form of my invention, I have illustrated an inner half wheel stamped and pressed from sheet steel and comprising a hub portion 10, spoke portions 11, 11, and a felly portion 12 (Figs. 1, 2 and 4). This inner member of the wheel, comprising hub, spoke and felly portions, is integral and formed, as stated, of a single sheet of metal. An outer half-wheel of substantially the same conformation is stamped and pressed from another sheet of metal and provided with a hub portion 13, spoke portions 14, 14, and a felly portion 15. The hub, spoke and felly portions of the inner half wheel are provided with flanges or webs 16, 16, lying substantially in the median plane through the spokes of the wheel, each of these flanges continuing uninterruptedly about each of the openings between adjacent spokes and the intervening portion of the felly, as best illustrated in Fig. 1. In somewhat similar manner, the outer half-wheel is provided with flanges 17, 17, projecting from the hub, spoke and felly portions, the flanges of the outer wheel member being crimped or beaded over the flanges of the inner wheel member, as best illustrated in Figs. 2, 3 and 5. The crimped seams formed of these flanges 16 and 17 hold the two half-wheel members together, but they serve other important functions, subsequently to be described.

The hub portion of the two half wheels is shown in the drawings as clamped between a brake drum 18 and a hub 19, the bolts 20 serving to draw the parts together. In order to prevent the collapse of the hub portion of the wheel proper, I provide a hub filler 21, preferably formed of a strip of metal bent into a serpentine form, comprising a series of U's. The two ends of the strap from which this serpentine hub filler is bent may be joined by brazing or welding or the abutting ends may be left open, as may be preferred. It will be noted that the outer convolutions of the serpentine hub filler pass around the clamping bolts 20, 20, whereas the inner ends of the convolutions are held in place by the circular bosses 21', 21', formed in the hub portion of the inner half-wheel member and the circular bosses 22, 22 formed in the hub portion of the outer half-wheel member. These circular bosses are pressed in positions such that they will fall directly opposite one another and thus provide projections which will hold the inner convolutions of the hub filler in place. The convolutions in the hub filler give it strength to prevent collapse of the hub due to the pressure exerted by the bolts 20, 20.

Any desired form of hub cap is indicated at 23.

In Fig. 7, I have shown a modified construction in which the hub filler 24 is of hard wood. In this case, the bosses 21' and 22 may be omitted from the hub portions of the half-wheel members. The circular collars 25 and 26 surrounding the central opening are, however, retained to give a finish and a bearing for the hub proper and to aid in maintaining the position of the hub filler.

In Fig. 5, I have illustrated in partial cross-section the conformation of the felly portions of the two half-wheel members, while in Fig. 6 I have illustrated a sheet metal felly filler, which preferably is in the form of a continuous ring. This felly filler comprises a tread 25', formed integrally with side flanges 26' and 27 which extend inside the felly portions 12 and 15 of the half-wheel members. It will be noted that the peripheries of the felly portions 12 and 15 are slightly inturned to register with suitable depressions formed in the outer edges of the felly filler, whereby the felly filler is gripped within the embrace of the felly portions of the half-wheel members.

The inturned peripheries of the felly portions of the half-wheel members, together with the tread 25' of the felly filler, provide a substantially cylindrical wheel face, over which the rim band 28 is slipped and held in place by means of the rim bolts 29, 29, the detachable rim being indicated at 30 and the clamping lugs being indicated at 31. It will be understood that the rim band and tire rim may be varied in conformity with present or future practice and in conformity also with the style of pneumatic tire, as indicated at 32. In Fig. 1, I have indicated the holes 33, 33, through which pass the rim bolts 29.

Fig. 8 illustrates a modified felly construction in which the peripheries of the felly portions of the half-wheel members are turned in toward the hub of the wheel as indicated at 34, 34, thus giving strength and rigidity to the completed felly.

The wheel of my invention may be manufactured very cheaply by means of appropriate automatic machinery. It has a pleasing and attractive appearance and by the use of comparatively thin sheet metal a light construction is obtained. The disposition of the metal is such, however, that the wheel has very great strength. The spokes, particularly of the rear wheels of an automobile, must transmit a large torsional moment from the hub to the tire and it will be noted that the triple thick ribs formed of the flanges 16 and 17, being formed integrally with the more or less nearly tubular portions of the spokes, are both in shape and position such as to add greatly to the strength of the spokes in so far as their ability to transmit the torsional moments is concerned. To put the matter in another way, the moment of inertia of the section illustrated in Fig. 3, about the neutral axis A, A, is very largely increased by the flange 16 and the crimped flange member 17.

Automobile wheels are subjected not only to torsional moments, which are transmitted through the spokes acting more or less as fixed beams, but the peripheries of the wheels are subjected to tremendous side pressures which must be transmitted to the axles. It will be noted in Fig. 3 that the spokes are dished in such manner as to elongate the dimension perpendicular to the neutral axis B, B, whereby the moment of inertia about this neutral axis is made substantially greater than would be the case with a substantially circular cross-section. This increased dimension of the spokes in the direction of the neutral axis A, A of Fig. 3 very materially strengthens the spokes in so far as their ability to carry the stresses incident to side thrust is concerned. The spoke form indicated in Fig. 3 has not only great strength when regarded as a fixed beam, but also when regarded as a column in carrying the weight upon the automobile axles. But this form, notwithstanding its strength, has an attractive and pleasing appearance.

The bead formed of the flanges 16 and 17 of the felly portions, as best illustrated in Fig. 5, gives great strength and rigidity to the felly, particularly at the points substantially midway between the several spokes where the wheel must carry a load tending to buckle the felly. The continuity of the spoke and felly beads adds materially to the strength of the connection between the spokes and the felly and aids materially in carrying and transmitting the necessary strains between spokes and felly, and vice versa.

Notwithstanding the substantially hollow construction of the wheel, the hub fillers provide the necessary resistance to prevent collapse of the hub portion of the wheel, the hub 19 and the brake drum (or a suitable substitute in the case of a front wheel) aiding the hub filler and the hub portions of the half-wheel members in transmitting side thrust to and from the axle to the periphery of the wheel. The conformation of the felly and felly filler when used as shown in Fig. 4 provide the necessary strength in the felly.

Now having described my invention, I claim as new and desire to secure by Letters Patent:

1. A wheel of the class described; comprising in combination a pair of substantially symmetrical dished sheet metal members; each of said members comprising a felly section, a hub section, and a plurality of spoke sections interposed between the hub and felly sections; a serpentine spacer interposed between the hub sections; and a plurality of bosses formed in one of the hub sections arranged to prevent displacement of the spacer.

2. A vehicle wheel comprising in combination a pair of substantially symmetrical dished sheet metal members, each comprising a felly section, a hub section and a plurality of spoke sections interposed between the hub and felly sections, the hub section, spoke sections and felly section of each of said dished sheet metal members being formed integral with one another, a metal strip bent into serpentine shape interposed between the hub sections of the dished sheet metal members, means for clamping the hub section to said serpentine spacer, an annular spacer interposed between the felly sections of the sheet metal members and means for clamping the felly sections to said annular spacer so as to form a wheel rim.

3. A vehicle wheel of the class described comprising a pair of substantially symmetrical dished sheet metal halves, each comprising a hub section, a felly section, and a plurality of spoke sections interposed between the hub and felly sections, the hub, felly, and spoke sections of each half being formed integral with one another, an annular spacer of substantially U shape in cross section disposed between the felly sections with the legs of the U abutting against the adjacent faces of the felly sections, and that portion of the U extending between the legs thereof lying at the periphery of the wheel and constituting the cylindrical wheel periphery, a rim band substantially L shape in cross section disposed around the periphery of the wheel with one arm of the L lying at one side of the felly, and clamping bolts extending through the rim band, felly sections, and the parallel legs of the spacer.

In witness whereof, I hereunto subscribe my name this 19th day of February, A. D., 1914.

LEON C. SCHWAB.

Witnesses:
J. J. STAMM,
R. STANLEY SMITH.